(12) United States Patent
Vadhri

(10) Patent No.: US 12,443,957 B2
(45) Date of Patent: Oct. 14, 2025

(54) PAYMENT SYSTEMS AND METHODS

(71) Applicant: Srinivas Vadhri, San Ramon, CA (US)

(72) Inventor: Srinivas Vadhri, San Ramon, CA (US)

( * ) Notice: Subject to any disclaimer, the term of this patent is extended or adjusted under 35 U.S.C. 154(b) by 281 days.

(21) Appl. No.: 18/084,785

(22) Filed: Dec. 20, 2022

(65) Prior Publication Data

US 2023/0206235 A1 Jun. 29, 2023

Related U.S. Application Data

(60) Provisional application No. 63/293,522, filed on Dec. 23, 2021.

(51) Int. Cl.
*G06Q 20/40* (2012.01)
*G06Q 20/36* (2012.01)
*G06Q 20/38* (2012.01)

(52) U.S. Cl.
CPC ....... *G06Q 20/4014* (2013.01); *G06Q 20/363* (2013.01); *G06Q 20/3827* (2013.01)

(58) Field of Classification Search
CPC ............ G06Q 20/4014; G06Q 20/363; G06Q 20/3827
See application file for complete search history.

(56) References Cited

U.S. PATENT DOCUMENTS

| 8,700,729 | B2* | 4/2014 | Dua | G06Q 20/40 |
| | | | | 705/64 |
| 10,176,477 | B2* | 1/2019 | Killian | G06Q 20/40 |
| 11,062,291 | B1* | 7/2021 | Brady | G06Q 20/10 |
| 2018/0218344 | A1* | 8/2018 | Bahnub | G06Q 20/102 |
| 2019/0303910 | A1* | 10/2019 | Asbe | G06Q 20/10 |
| 2022/0005023 | A1* | 1/2022 | Angelos | G06Q 20/4014 |

* cited by examiner

*Primary Examiner* — John W Hayes
*Assistant Examiner* — Zehra Raza
(74) *Attorney, Agent, or Firm* — David R. Stevens; Stevens Law Group

(57) ABSTRACT

Payment systems and methods that facilitate electronic payer-payee financial transactions, using one or more universal payment identifiers, are disclosed. One method includes a payer computing device receiving a payment credential associated with a payee. The payment credential may be mapped to a universal payment address. The payer computing device may request a payment server for a payee account information associated with the payment credential. The payment server may translate the payment credential to the universal payment address, resolve the universal payment address to the payee account information, retrieve the payee account information using the universal payment address, and transmit the payee account information to the payer computing device. The payer computing device may perform a payment PUSH operation to the payment server. The payment server may forward the payment PUSH operation to the payee account to complete a financial transaction between the payer computing device and the payee.

19 Claims, 13 Drawing Sheets

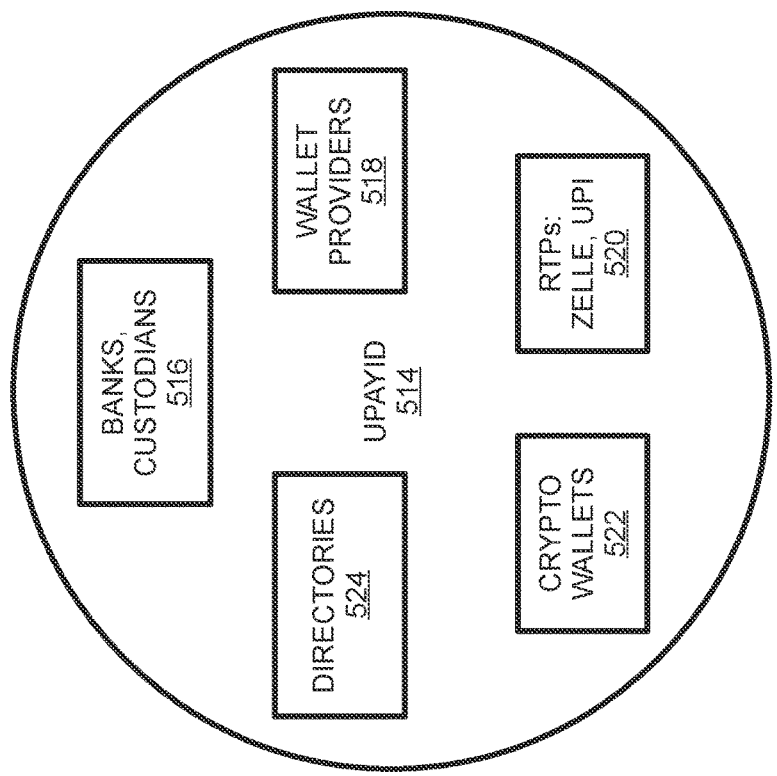
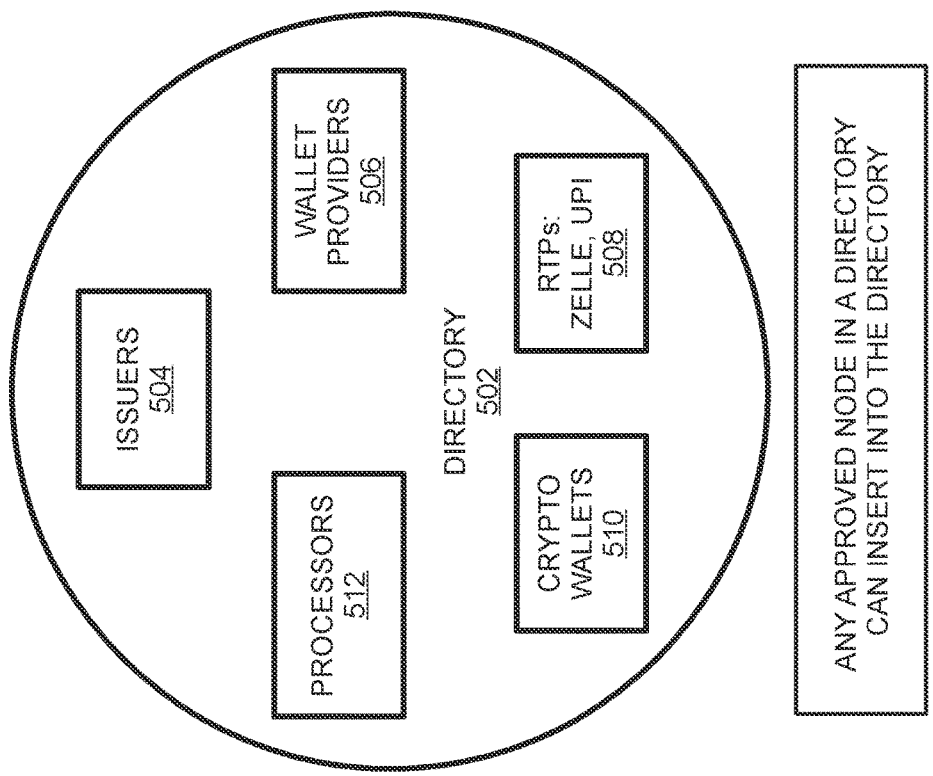
FIG. 5B
FIG. 5A

PAYEE IP ADDRESS
601

| OPERATION | INSTRUMENT | CUSTODIAN | IP ADDRESS |
|---|---|---|---|
| PUSH | DC | ISSUER | IP1 |
| PUSH | BANK ACCOUNT | ISSUER | IP2 |
| PUSH | WALLET | WALLET PROVIDER | IP3 |
| PUSH | CRYPTO | WALLETS | IP4 |
| PUSH | RTP | UPI/ZELLE | IP5 |

FIG. 6A

SEQUENCE OF OPERATIONS
602

| STEP | OPERATION | INSTRUCTION | DESCRIPTION |
|---|---|---|---|
| PAYER | GET | GET <IP_addresses><Payee ALIAS> for PUSH | Payer App enters Payee public alias: Phone or email known |
| DNS | GET Response | <Alias> IP1 PUSH<br><Alias> IP3 PUSH | Response from DNS resolver: gets ALL information by accessing a block chain |
| PAYER | - | Review payee information: name, physical address, payment credential details (account, etc.) | Payer can review payee name and physical address to confirm before proceeding to pay. If there are multiple payee payment credentials returned, the payer can review and select a payment credential based on one or more criteria (e.g., cost, speed, value/velocity limits, etc.) or payee's default choice |
| PAYER | PUT | PUT PUSH PUT <IP1> <amount> <Payer_Details> | Payer App PUSH (PUT) money to Payee payment instrument |

FIG. 6B

PAYEE IP ADDRESS
603

| PAYMENT METHOD | CUSTODIAN | PAYMENT CREDENTIAL | IP ADDRESS (UPA) | PAYMENT INSTRUMENT |
|---|---|---|---|---|
| DEBIT CARD | ISSUER | EMAIL ADDRESS | IP1 | CARD NUMBER/ TOKEN |
| BANK ACCOUNT | ISSUER | PHONE NUMBER | IP2 | ACCOUNT, ROUTING |
| WALLET | WALLET PROVIDER | WALLET ID PHONE NUMBER | IP3 | WALLET ENDPOINT |
| CRYPTO | WALLETS | COINBASE ID EMAIL ADDRESS PHONE NUMBER | IP4 | CRYPTO WALLET ADDRESS @NETWORK |
| RTP | UPI/ZELLE | PHONE NUMBER | IP5 | ZELLE ID |

FIG. 6C

PAYMENT SYSTEMS AND METHODS

This application claims the priority benefit of provisional patent application No. 63/293,522 titled "Universal Payment Address: Efficient Payer-Payee Payment Preferences and Credential Communication for Money Movement" filed on Dec. 23, 2021, the disclosure of which is incorporated by reference herein in its entirety.

BACKGROUND

Technical Field

The present disclosure relates to payment systems that facilitate electronic payer-payee financial transactions, using one or more universal payment identifiers.

Background Art

In contemporary financial transaction systems, when a payer (also referred to as a "payor") initiates a payment to a payee, lot more work needs to be done on the payer's side than on the payee's side. In such systems, a transaction may be broken down into the stages of:
- Preprocessing: Authentication of payer, authorization from payer, payee payment instrument preferences and credentials, payee name and physical address, transaction processing times and costs, and so on.
- Processing: Moving money, compliance, regulations, real-time fraud check, API monitoring, and so on.
- Postprocessing: Reporting, reconciliation, settlements, customer support/operations, and so on.

In general, the pre-processing step belongs to payer-side systems. While most of the associated information exchange is a routine workflow (e.g., authentication, authorization, etc.), knowing payee information (e.g., payee payment instrument preferences and credentials) ahead is a critical part in the flow.

An example of the challenges associated in a financial transaction flow is a payer-payee combination, where the payer wishes to send money to the payee. In order for the payer's wallet or payment service application (e.g., Western Union, XOOM, PayPal, Google Pay, etc.) to move money to the payee, the payer needs to know at least two things about the payee (receiver):
- The payee's preferred way of getting paid (e.g., Bank, Card, Wallet, Crypto, etc.),
- The payee's exact account details (specific account number/IBAN, card number, wallet address, and so on).
- The payee's full name and physical address may be needed for some use cases like international money transfers, and also address fraud issues that are prevalent in person-to-person (P2P) money movement.

Suppose the payer wishes to send money to any one of their 500+ contacts in their phone directory. For this, the payer needs to know at least one preferred way that the payee contact would like to receive the funds, including the payee's validated payment account details. If the payer gets a wrong payment account details, the associated costs can be high. For example, for sending money to a wrong bank account on ACH rails, the cost of a "No account, unable to locate account: R03" error is substantial for the payer service provider (charged by their respective originating depository financial institution (ODFI)). This will be more complex in a metaverse world (or cross-border) where interactions such as financial transactions happen in a non-traditional manner.

In contemporary person-to-person money transfer scenarios, a payer needs to know a payee's payment preference to send money, e.g., Bank Account, Wallet (PP, Venmo etc.), Debit Card, or RTP credential (Zelle, UPI handle, etc.). Additional required payee information may include the payee's full name and complete physical address. Furthermore, the payer needs to know the exact details of the preferred payment instrument of the payee. This problem is currently solved by the payer reaching out to Payee in an offline manner. Information being exchanged informally could violate compliance and other policies (like PCI, PSD2, CCPA, etc.) and even be exposed to man-in-the-middle attacks.

In pay-as-you-go, subscription, or rental scenarios, payers who like to rent or borrow or a device for a short time frame may include:
- A visitor/traveler renting a bike
- An airline traveler renting headphones for a short trip
- Households borrowing gadgets and devices every few years
- Renting a car for a short period of time In contemporary systems, the payment credential problem is currently solved by the payer calling the device provider and engaging in elaborate conversations with customer support. This defeats the purpose of ease of use. In case of a merchant payment scenario, the merchant initiates a request for payment with their payment account details. The payer reviews the details and pays using, for example, a QR code reader.

In another example, when a consumer exchanges credit card, debit card, or prepaid card information with a merchant (online or retail), the merchant has to send the card information and the purchase information to the card issuer (or to a payer system in the case of a "request to pay" scenario) to process payments. In this case, there could exchange of card information in online/internet channels and the risk of fraud through stolen credit cards is high.

SUMMARY

Aspects of the invention are directed to systems and methods for implementing financial transaction protocols between a payer and a payee using one or more universal payment identifiers (also referred to as "universal payment addresses") associated with the payee. One method includes a payer computing device receiving a payment credential (e.g., an alias or an identifier) associated with a payee. In one aspect, the payment credential mapped to a universal payment address (i.e., a universal payment identifier). The payer computing device may request a payment server for a payee account information associated with the payment credential. The payment server may translate the payment credential to the universal payment address, and resolve the universal payment address to the payee account information.

The payment server may retrieve the payee account information using the universal payment address, and transmit the payee account information to the payer computing device. The payer computing device may perform a payment PUSH operation to the payment server. In one aspect, the payment server forwards the payment PUSH operation to the payee account to complete a financial transaction between the payer computing device and the payee.

Aspects of the invention include apparatuses that implement the above methods.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 5A is a schematic diagram depicting a directory to store data associated with a payment system.

FIG. 5B is a schematic diagram depicting a payment identification directory to store data associated with a payment system.

FIG. 6A depicts an IP address table that presents different payment credentials for a payee.

FIG. 6B is a table that presents a sequence of operations associated with a financial transaction.

FIG. 6C depicts an IP address table that presents different payment credentials for a payee.

DETAILED DESCRIPTION

Figure 1:
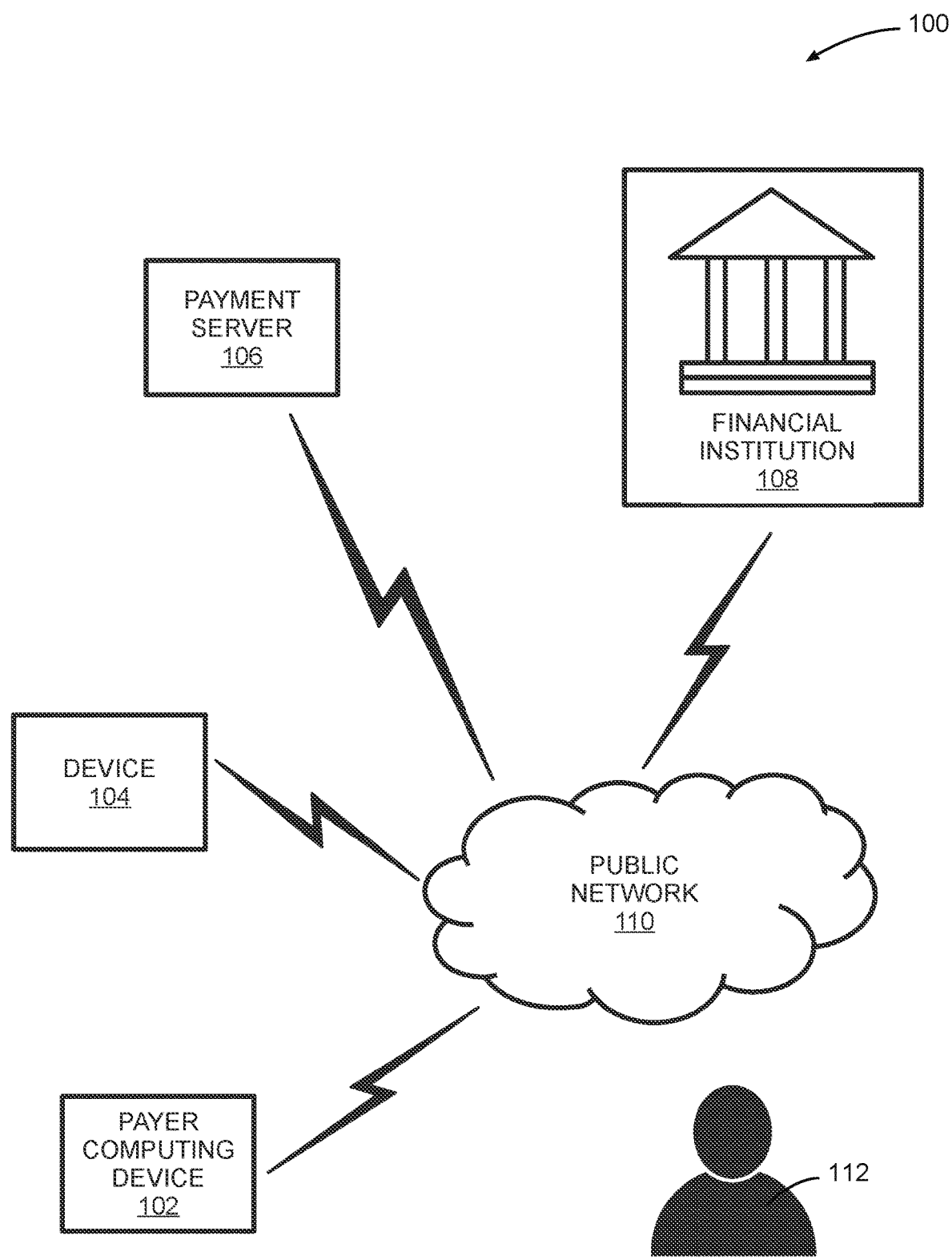
FIG. 1 is a block diagram depicting an embodiment of a payment system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein address the shortcomings associated with contemporary financial transaction systems. The systems and methods described herein implement a universal payment address scheme associated with payment accounts. In one aspect, a payer or payee is associated with one or more universal payment addresses. A payer wishing to send money to a payee may request that the funds be sent to the payee using a universal payment address associated with the payee. A payment server may resolve the universal payment address direct the payment to an appropriate payment instrument, and direct the funds to a financial account associated with that payment instrument.

FIG. 1 is a block diagram depicting an embodiment of a payment system 100. As depicted, payment system 100 includes payer computing device 102, device 104, payment server 106, financial institution 108, public network 110, and payee 112. In one aspect, payer computing device 102 may be associated with a payer (e.g., a human user who wishes to sends send money or finances to a payee). Device 104 may be associated with a payee (e.g., payee 112 or some other payee). Examples of device 104 include but are not limited to a washer in a public laundry facility, a scooter for rent, a car for rent, a set of wireless headphones for rent, and so on.

In aspects, payer computing device 102 may be any of a mobile phone, a tablet, a laptop computer, a desktop computer, or so on. In general, the phrase "computing device" may be used herein to describe any device that includes a processor, a memory, and a network connection.

In one aspect, a payer wishes to use payer computing device 102 to send funds (e.g., money, cryptocurrency, etc.) to an account (e.g., a financial account) associated with payee 112. This account may also be referred to as a "payee account." The account used by the payer to send the funds may be referred to as a "payer account." To accomplish this, payer computing device 102 may receive one or more payment credentials associated with payee 112. These payment credentials be one or more aliases or identifiers that may include information about payee 112, such as name, email address, telephone number, social media handles or usernames, tax identification number, one or more IDs related to mobile wallets (e.g., Zelle, Venmo, etc.), other aliases that the payee might be using, and so on. In one aspect, each payment credential is mapped to a universal payment address; any combination of these universal payment addresses may be made available to the payee.

Payer computing device 102 may receive or access the payment credentials in one of several ways. For example, the payment credentials may be stored in an address book on payer computing device 102. Or, the payer associated with payer computing device 102 may access the payment credentials online via, for example, one or more social media sites that are used by payee 112. Payer computing device 102 may then request payment server 106, via public network 110, for a payee account information associated with a payment credential. This payment credential may be selected by the payer.

In one aspect, each payment credential associated with payee 112 is mapped to a unique IP address (also known as a universal payment address, or "UPA") that may be similar to a uniform resource locator (URL). This IP address is the universal payment address, or universal payment identifier. This IP address may be linked to a unique payment instrument or payment account associated with payee 112. For example, a phone number associated with payee 112 may be uniquely linked to a Zelle account associated with payee 112. Or, a Facebook user ID may be linked to a Meta Pay account. A Merchant's URL or Merchant ID could be linked to a Bank Account for receiving all payments from Consumers. Payment server 106 may receive the selected payment credential and resolve (or translate) the payment credential to the corresponding universal payment (IP) address, and further resolve universal payment address to the associated payee account information. Payment server 106 may then retrieve the payee account information using the universal payment address, and transmit the payee account information via public network 110 to payer computing device 102.

In one aspect, payer computing device 102 receives the payee account information, and authorizes payment server 106 to initiate a payment transaction for a specified amount from the payer account to the payee account. This authorization may be initiated by the payer. In one aspect, the authorization by payer computing device 102 may be performed via a PUSH payment operation (also referred to herein as a "PUSH" operation). Payment server 106 may contact financial institution 108 to perform the associated financial transaction (e.g., a funds transfer) from the payer account to the payee account. Other aspects of payment system 100 can be configured to use either a PUSH operation or a PULL operation (for Merchant payments using the Request for Pay construct), or any combination thereof.

In one aspect, both the payer account and the payee account are commonly located in financial institution 108. In this case, financial institution 108 initiates the financial transaction internally. In another aspect, the payer account and the payee account are located in different financial institutions (not depicted in FIG. 1). In this case, the financial institution associated with the payer account initiates the financial transaction with the financial institution associated with the payee account.

In one aspect, the payer may want to initiate a financial transaction with a payer associated with device 104. For example, the payer may want to rent device 104 (which may be a scooter). In this case, payer computing device 102 may receive payment credentials for the payee associated with device 104. These payment credentials may be received similar to the payment credentials for payee 112. In other aspects, payment credentials are received by payer computing device 102 directly from device 104. For example, payer computing device 102 may scan a QR code or bar code off of device 104. Or, the payer may read the payment credentials printed on device 104 and enter the payment credentials manually on payer computing device 102. A transactional process for the payer associated with payer computing device 102 to pay a payee associated with device 104 may be similar to the process used to pay payee 112.

Payment system 100 may include the following features:
  A payer can use publicly-available information about a payee, such as phone number, email, tax ID, LinkedIn, Facebook ID, Device ID, etc. This publicly-available information may be used as credentials for payment purposes (referred to herein as "payment credentials").
  Global functionality in any region with Internet access.
  Leverages Internet Protocols for all aspects of communication
  Substantially seamless experience for Payer and Payee:
    Discovery
    Preferences
    Essential payee details required for use cases like money transfer
    Choices to both payer and payee on how to pay Communication between payer computing device 102 and payment server 106 may be implemented and managed by one or more computer application programs running on each of payer computing device 102 and payment server 106. This communication may happen via public network 110.

The systems and methods described herein implement propose a universal payment address built around existing Internet Protocols and Web3 technologies. Such a universal payment address scheme and the associated communication protocols may be implemented using payment system 100. In one aspect, payment system 100 integrates with systems like @Meta Pay, @Google Pay, or even PSPs like @Stripe, @Finix, @FIS, @FISERV, Global Payments, etc.

In contemporary technology, web3 is shifting the preferences to the consumer. Consumers have a lot more options now than just a bank account, and their preferences can be incorporated into payment system 100. On average, a US consumer has: 1-2 Bank Accounts, 2 Cards, and 2-3 Wallets. Getting to know the consumer's preference for receiving money with an accurate payment instrument value is getting closer to Web3. This could become more relevant in a Metaverse world where Web3 wallets could become the sources of information.

There is a possibility that device bound-interactions will become more common in the future. One possible financial model is consumers adapting a "pay as you go" (subscription)-based model for the majority of their needs for devices. Current system implementations allow bicycles to be rented for short-term use. Appliance rentals (e.g., for refrigerators or washing machines) and automobile rental schemes may be implemented. For travelers, high-fidelity headphones can be borrowed at the airport before a flight, and returned at the destination.

In one aspect, payment credentials are viewed a universal resource. Each payment credential is associated with a universal payment address (UPA) (also known as a universal payment ID, or UPI) that can be an IP address or an address similar to an IP address. For a specific user (i.e., a payer or a payee), each their bank account, Google Pay account, Zelle account, etc. is mapped to a unique IP address.

In one aspect, a sequence of establishing and using a universal payment address may include the stages of:
Issue a UPA to debit card or other payment instrument.
Ping resource to that UPA
Payment server 106 calls the UPA and give the debit card information
A PUSH payment operation is performed to the UPA. With this system, there is no need to know the details of a specific payment instrument; all that is needed to complete the transaction is a UPA.

In one aspect, a payment credential may be retrieved from a string or set of publicly available identifiers. Each identifier gets attached to a unique payment instrument. To initiate a financial transaction or a funds transfer, if a payer authorizes the financial transaction to send money to a financial instrument associated with a phone number, the phone number gets relayed to the corresponding IP address (UPA). Alternatively, any publicly available address that may be available may be used, such as a LinkedIn address. In this case, the LinkedIn address can be used to call payment server 106. Payment server 106 can translate all publicly-available phone numbers or other payment credentials to the corresponding IP addresses (UPAs).

In one aspect, a core layer of payment system 100 is a UPA (e.g., an IP address) mapped to a payment instrument. On top of this core layer is an alias that can be saved in a block chain to correspond to the universal payment address. All payment schemes may populate this the block chain in this manner. In one aspect, populating the block chain or any other directory or database with a set of all payment credentials and corresponding UPAs may be performed by the issuers of the respective financial instruments.

In one aspect, if a payer wishes to make a payment to payee 112 or device 104, a set of payment credentials associated with the payee may be provided to the payer on payer computing device 102, via payment server 106. In addition to providing the payer with different payment options, the payment credential data may include further details about the corresponding accounts. For example, cost information (i.e., the amount it would cost the payer and/or the payee for the financial transaction as charged by the issuer of the financial instruments), and timing information (i.e., how quickly the payment transaction will be processed by the payment processor) may be provided to the payer in addition to the payment credential data. The payer and payee may then agree on a suitable financial instrument to be used for the financial transaction. For example, a bank may charge 10 cents for a financial transaction that is completed in substantially real-time. The same bank may charge 5 cents for a one-day delay in transferring the funds. A dollar may be charged if the financial transaction is routed to a debit card. In another example, a bank may take approximately 3 hours to process a financial transaction for transfer to a bank account; a debit card transfer may take approximately 30 minutes, and so on.

In another example, a payee may prefer a debit card transfer if an amount associated with the financial transaction is $1000 or more. The payee may prefer a bank account transaction if the amount is $50 or less. In general, payment credential data includes the cost of a financial transaction and the time it would take to settle that transaction for that particular payment credential. In one aspect, payment server 106 provides additional information like cost, value-velocity limits, speed for settlements, acceptable regulations, etc. for each universal payment identifier, so that payer computing system 102 can make appropriate decisions during the PUSH payment.

In another example, a payer might like to confirm a payee name and physical address before proceeding to pay the payee. Confirmation of payee information like name and physical address before taking the important step of sending the money can help reduce chances of fraud and possibly remove any associated risks.

In another example, a card issuer (credit, debit or pre-paid), while issuing the card to a consumer or a business, could assign a corresponding public alias (e.g., the consumer's phone or email, or the small business's tax ID, business name or website name) to an IP Address which is linked to the card number (or its token equivalent). When the consumer or business wishes to pay a merchant, the merchant would get the card number or token as a part of the purchase process, or use a "Request for Payment" construct to let the consumer or business PUSH payment to the merchant's IP address (which is mapped to a payment credential by the acquirer). In the case of pre-paid card issuance, the program manager can issue the pre-paid card with an amount funded, and the card issued would have an IP address and an associated public alias of the user with the payment credential. With this personalization, a prepaid card has more utility value for the card instrument and becomes more relevant in a social media or a web3 setting.

Embodiments of payment system 100 may also include routing intelligence that can alert a payer of any anomalous conditions associated with the payee account. Examples of anomalous conditions include a seized account, a fraudulent account (fraud alert), account limits, and other transfer-related account surcharges. Using a Universal Payment Address (UPA) scheme with payment system 100 ensures no public advertising of account numbers for either payer accounts or payee accounts. Only qualified payment servers (e.g., payment server 106) can get account info/credentials. Block chains may be used to limit access to account data to further prevent unauthorized access.

Figure 2:
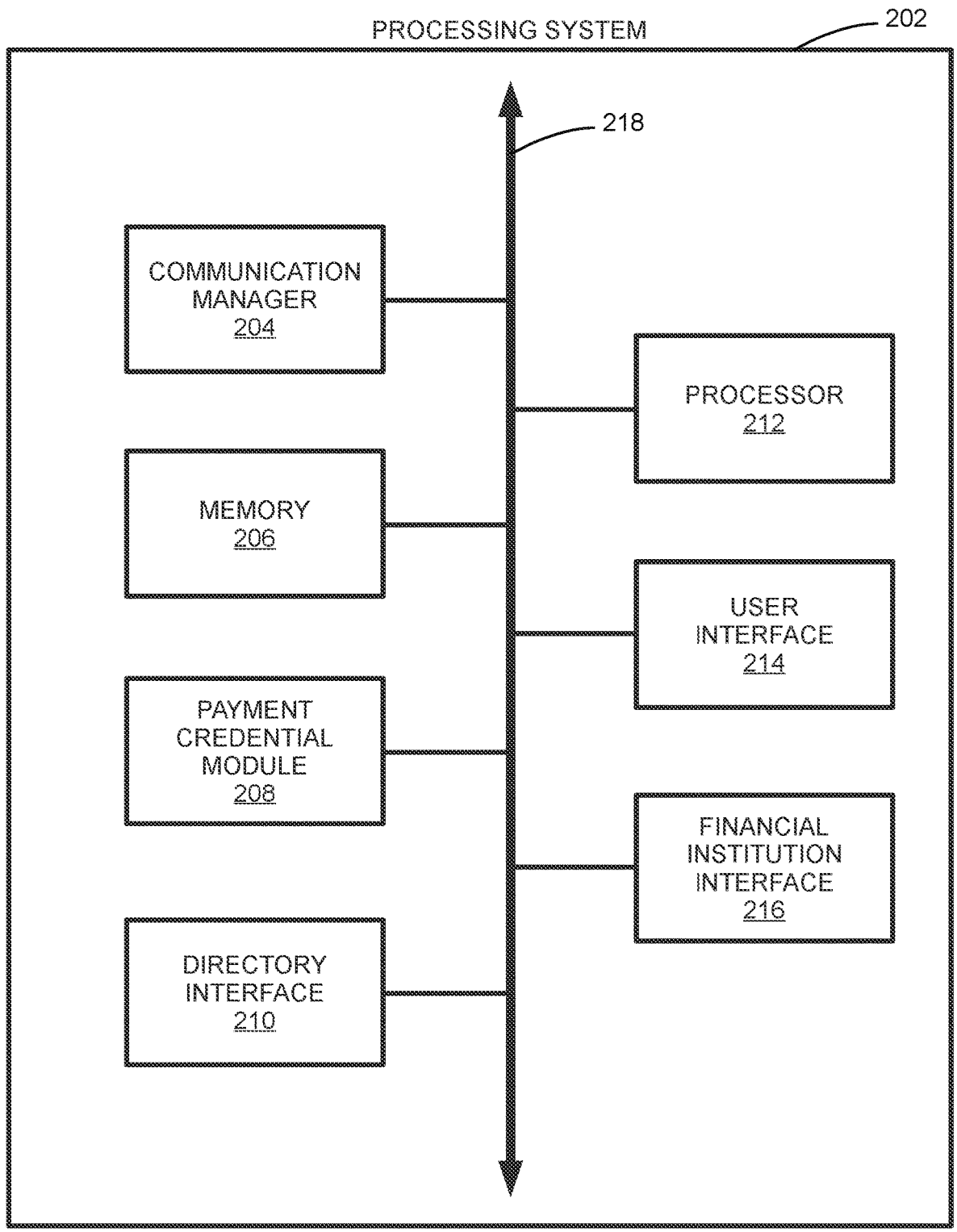
FIG. 2 is a block diagram depicting an embodiment of a processing system that may be used to implement various embodiments of a payment system.

FIG. 2 is a block diagram depicting an embodiment of a processing system 202 that may be used to implement various embodiments of a payment system. Processing system 202 may be used to implement some embodiments of payment server 106. As depicted, processing system 202 includes communication manager 204, memory 206, payment credential module 208, directory interface 210, processor 212, user interface 214, and financial institution interface 216.

In some embodiments, communication manager 204 is configured to manage communication protocols and associated communication with external peripheral devices as well as communication with other components in processing system 202. For example, communication manager 204 may be responsible for generating and maintaining a communication interface between processing system 102 and public network 110.

Memory 206 may be configured to store data associated with payment server 106. In one aspect, memory 206 includes both long-term memory and short-term memory. Memory 206 may be comprised of any combination of hard disk drives, flash memory, random access memory, read-only memory, solid state drives, and other memory components.

Payment credential module 208 may be configured to perform functions such as resolving one or more payment credentials to the respective financial accounts. In some aspects, payment credential module 208 functions in a manner similar to a DNS lookup server. A payment credential can be viewed as an analog to a web address. Just as a DNS lookup server translates a web address to an IP address, payments server 106 (specifically, payment credential module 208) translates a payment credential to an IP address (UPA) that corresponds to the corresponding payee account information (also known as a "payment instrument").

Directory interface 210 may be configured to interface processing system 202 (i.e., payment server) to a directory or an open-ended ledger, accessible via public network 110. In an aspect, a block chain is used to implement the directory or open-ended ledger.

A processor 212 included in some embodiments of processing system 202 is configured to perform functions that may include generalized processing functions, arithmetic functions, and so on. Processor 212 is configured to process information associated with the systems and methods described herein.

User interface 214 allows a user to interact with embodiments of the systems described herein. User interface 214 may include any combination of user interface devices such as a keyboard, a mouse, a trackball, one or more visual display monitors, touch screens, incandescent lamps, LED lamps, audio speakers, buzzers, microphones, push buttons, toggle switches, and so on.

Financial institution interface 216 may be configured to enable processing system 202 (i.e., payment server 106) to communicate with financial institution 108 via public network 110.

A data bus 218 communicatively couples the different components of processing system 202, and allows data and communication messages to be exchanged between these different components.

Figure 3:
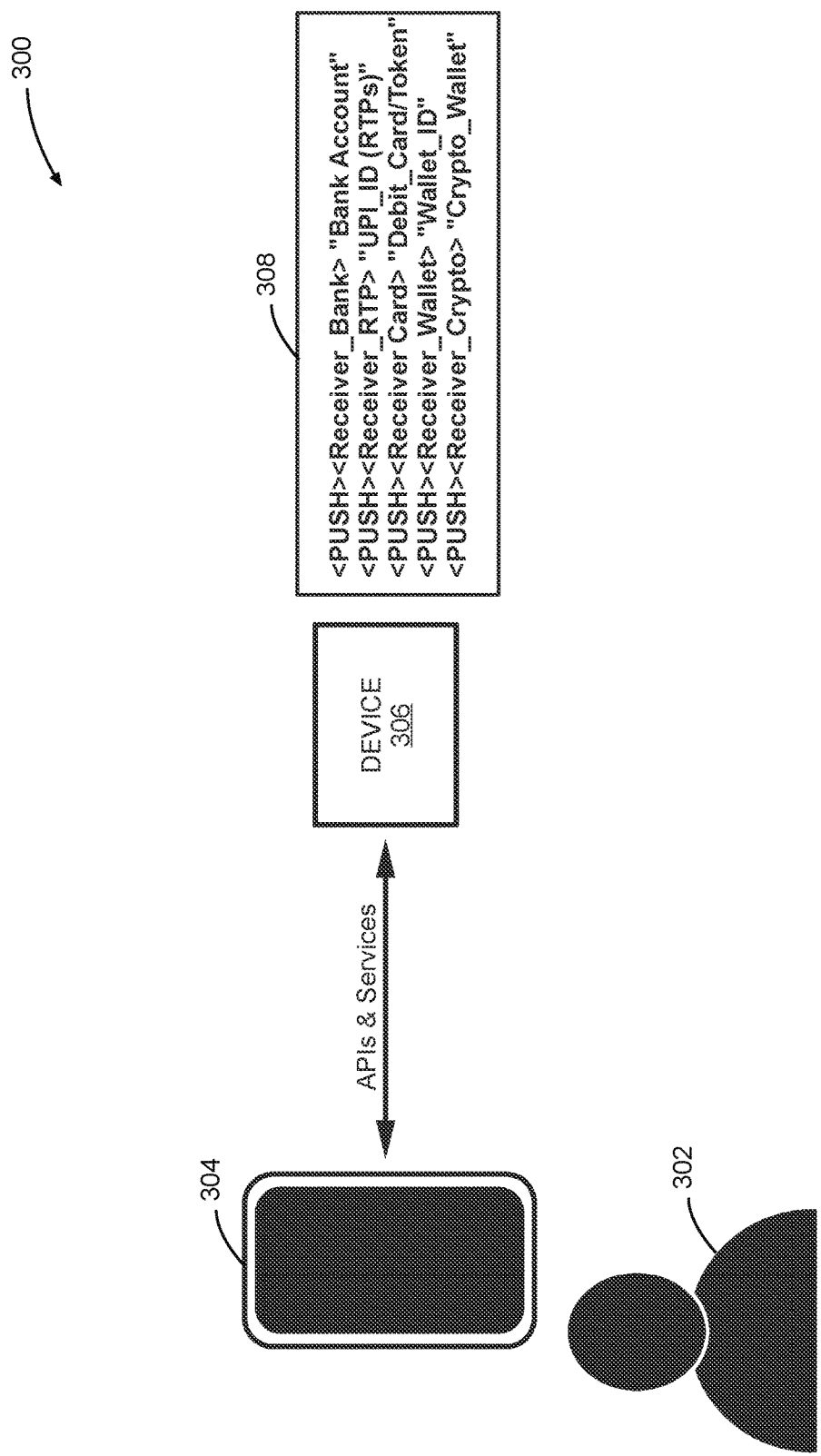
FIG. 3 is a schematic diagram depicting a financial transaction between a payer computing device and a device.

FIG. 3 is a schematic diagram depicting a financial transaction 300 between payer computing device 304 and device 306. As depicted, financial transaction 300 includes payer 302 wishing to make a payment to a payee associated with device 306. This is accomplished by payer 302 using payer computing device 304. Payer computing device 304 may be similar to payer computing device 102. Device 306 may be similar to device 104. Device 306 may be a device that payer 302 wishes to rent (e.g., a car, an appliance, a scooter, etc.).

In one aspect, payer computing device 304 communicates with device 306 using one or more APIs and services. For example, payer computing device 304 may use a camera and a QR code reader application to read one or more payment credentials that might be printed or displayed on device 306. Or, payer 302 can enter the payment credentials manually into a software application running on payer computing device 304. In one aspect, payment credential options for device 306 are set by a service provider associated with device 306.

In one aspect, payer computing device 304 requests and completes a financial transaction with a payee account associated with device 306 in a manner similar to the payment transaction between payer computing device 102 and device 104. In other words, payer computing device 304 uses the payment credentials associated with device 304 to initiate and complete financial transaction 300 (i.e., send funds to a payee account associated with device 304).

Payer computing device may use a PUSH operation to authorize the corresponding payment. In one aspect, payer computing device 304 may be configured to select from a plurality of payment credentials associated with device 306. Accordingly, payer computing device performs one PUSH operation from a plurality of PUSH operations 308. As depicted in FIG. 3, the plurality of PUSH operations 308 includes:

A PUSH operation to a bank account
A PUSH operation to a real-time payment (RTP) account
A PUSH operation to a debit card or a token
A PUSH operation to a wallet
A PUSH operation to a cryptocurrency account Such a PUSH operation is used to complete financial transaction 300 that involves payer 302 sending funds to a payee account associated with device 306. Plurality of PUSH operations 308 may include other payee account options such as a payee bank account, wallet address, crypto end point, card credentials, or virtual wallet. The payee could also be represented by their alias or IP address, where the payment service provider has to do a GET call to get the actual payee credentials The above sequence of operations can be summarized as:
Payer 302 uses a computing device 304 to GET all options on how to pay-per-use for device 306.
Payer 302 selects a way to pay with the options provided based on what s/he are comfortable with based on information received from the payer-side systems.
PUSH payment to the end point based on instructions received.

Figure 4A:
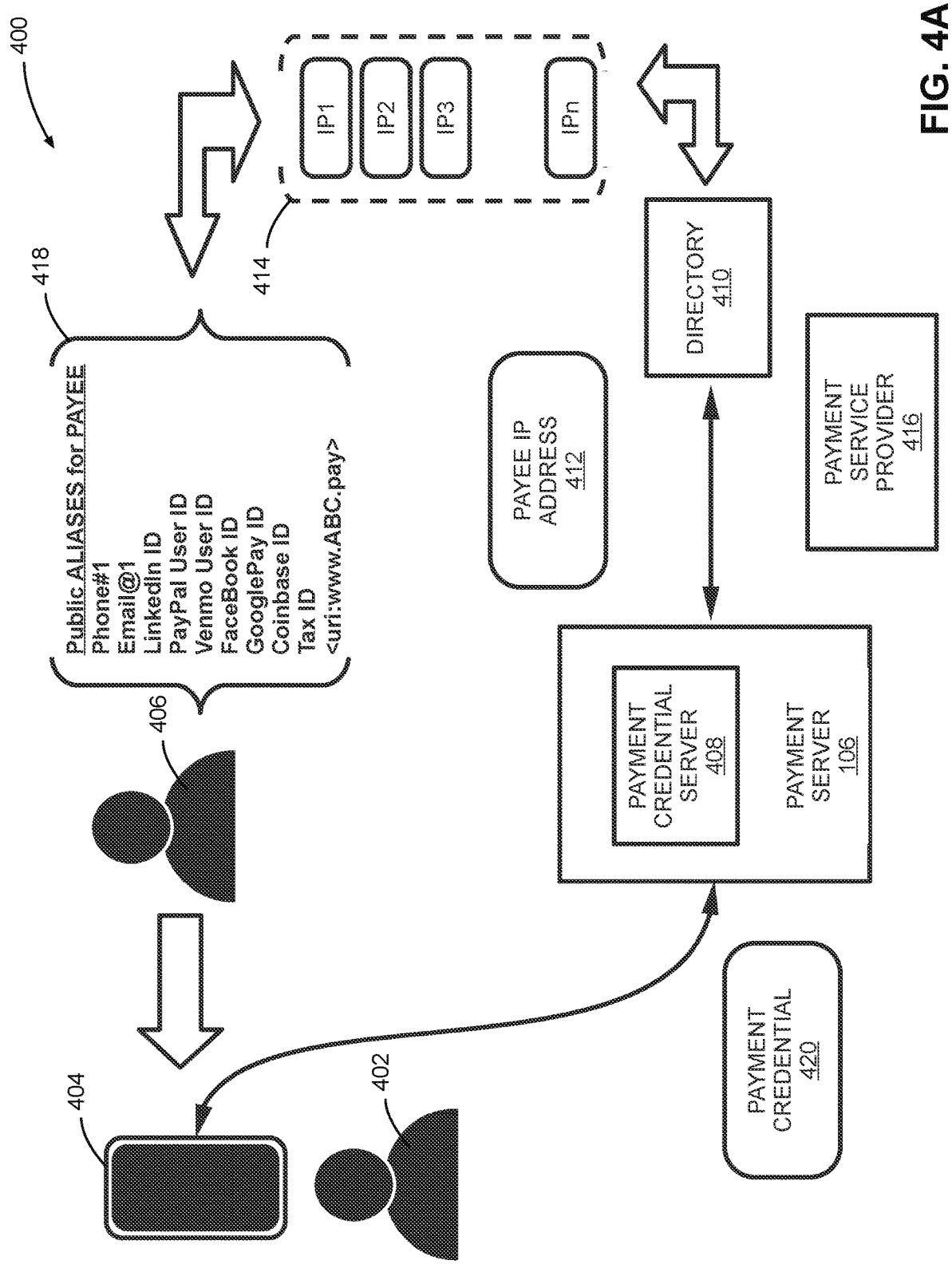
FIG. 4A is a schematic diagram depicting a financial transaction between a payer computing device and a payee.

FIG. 4A is a schematic diagram depicting a financial transaction 400 between a payer computing device and a payee. As depicted, financial transaction 400 includes payer 402, payer computing device 404, payee 406, payment server 106, and directory 410. Payment server 106 may further include payment credential server 408.

As depicted, financial transaction 400 includes payer 402 wishing to make a payment to payee 406. This is accomplished by payer 402 using payer computing device 404. Payer computing device 404 may be similar to payer computing device 102. To accomplish financial transaction 400, payer computing device 404 receives one or more payment credentials 418 associated with payee 406. These payment credentials 418 can include public aliases for payee 406, such as:

A phone number associated with payee 406
An email address associated with payee 406
A LinkedIn ID associated with payee 406
A PayPal user ID associated with payee 406
A Venmo user ID associated with payee 406
A Facebook ID associated with payee 406
A Google Pay ID associated with payee 406
A Coinbase ID associated with payee 406
A Tax ID associated with payee 406
A uniform resource identifier (URI) associated with payee 406

In one aspect, each of the payment credentials in payment credentials 418 maps to a unique payee IP address in IP address table 414. IP address table 414 may be stored in directory 410. IP address table may include n IP addresses—IP1, IP3, IP3, through IPn. Each of these IP address may correspond to a unique UPA. The payee phone number may be mapped to IP1; the payee email address may be mapped to IP2, and so on. Of these IP addresses, payer 402 selects a payment credential 420, from payment credentials 418, to initiate financial transaction 400.

To complete financial transaction 400, payer computing device 404 may initiate a payment transaction via payment server 106 using payment credential 420. In one aspect, the payment credential is selected by payer 402. Payment credential server 408 may resolve payment credential 420 to unique payee IP address 412. This resolution may be performed by payment credential server 408 communicating with directory 410. Payee IP address 412 may be one of IP1, IP2, through IPn. In one aspect, directory 410 is a block chain implementation that contains the payment credential-to-payee IP address-to bank account mapping. Using information from the resolution, payment server 106 may complete financial transaction 400 from a payer financial institution to a payee financial institution, each of which may be similar to financial institution 108. In one aspect, the financial transaction is completed by payment credential server 408 and/or payment server 106, via payment service provider 416.

Figure 4B:
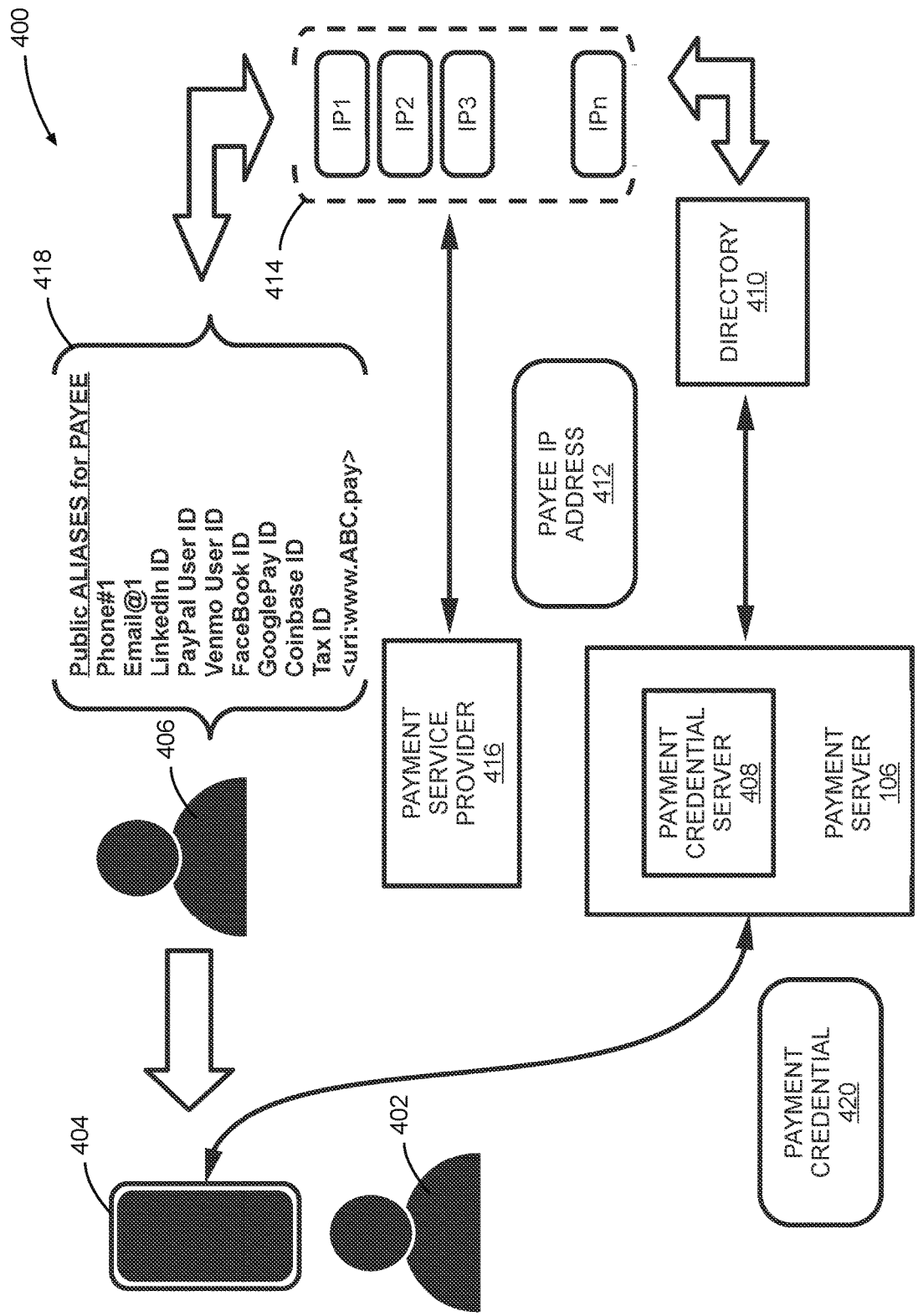
FIG. 4B is a schematic diagram depicting a financial transaction between a payer computing device and a payee.

In one aspect, payment service provider 416 directly accesses IP address table 414 via directory 410. By directly accessing IP address table 414, payment service provider 416 may directly process a PUSH transaction initiated by payer 402. FIG. 4B is a schematic diagram depicting a financial transaction between a payer computing device and a payee, where payment service provider 416 directly accesses IP address table 414.

FIG. 5A is a schematic diagram depicting a directory 502 to store data associated with a payment system. As depicted, directory 502 includes data associated with issuers 504, wallet providers 506, RTPs 508, crypto wallets 510, and processors 512.

In one aspect, directory 502 is an open-ended ledger. Directory 502 may be implemented as a block chain.

Issuers 504 may include issuers of financial accounts such as banks, credit unions, custodians, etc. Examples include Bank of America, Wells Fargo Bank, etc. Wallet providers 506 may include an issuer of one or more digital wallet accounts (e.g., Google Pay, Apple Pay, CoinBase, MetaMask etc.).

In one aspect, RTPs 508 include one or more real-time payment providers such as Zelle or a unified payments interface (UPI) from India. Crypto wallets 510 may include wallets such as Coinbase and crypto.com wallets. Processors 512 may be payment processors that enable and implement one or more financial transactions between a payer and a payee. Examples of payment processors include PayPal, FIS, FiServe, Stripe, WISE, Digital River, WorldPay, Global Pay, and Square.

In one aspect, directory 502 contains information that allows payment server 106 to facilitate a financial transaction between a payer and a payee using the systems and methods described herein. Directory 502 may be similar to directory 410. In one aspect, directory 502 includes data that:

Enables payment server 106 to perform a payment credential-to-payee account information lookup and resolution,
Payment server 106 can use to execute the funds transfer authorization from the payer to the payee.

For example, if a payer wishes to use a digital wallet to transfer funds to a payee, payment server 106 may use data from wallet providers 506 to map the corresponding payee payment credential to the appropriate digital wallet account. Using this mapping, payment server may then authorize the transfer of funds from the payer account to the payee account.

In one aspect, any approved node or authorized user in a directory can insert data into the directory. In another aspect, a payment credential is stored on a block chain by the payee's institution or anyone with a role described by the governance rules dictated by the Decentralized Autonomous Organization (DAO). This prevents unauthorized access to the directory, and helps avoid nefarious activity or tampering with the data stored in the directory.

In one aspect, publicly-available service or application programming interface (API) is used by an authorized user or authorized party to create a unique universal payment address (i.e., a universal payment identifier) for a payment credential. This universal payment address may be stored in a central location such as a directory or a block chain. A specific aspect may include a publicly-available service or API that can be used to retrieve (GET) a payment credential for a universal payment identifier.

FIG. 5B is a schematic diagram depicting a payment identification directory UPAYID 514 to store data associated with a payment system. As depicted, UPAYID 514 includes data associated with banks and custodians 516, wallet providers 518, RTPs 520, crypto wallets 522, and processors 524.

In one aspect, UPAYID 514 is an open-ended ledger. UPAYID 514 may be implemented as a block chain.

Banks and custodians 516 may include issuers of financial accounts such as banks, credit unions, custodians, etc. Examples include Bank of America, Wells Fargo Bank, etc. Wallet providers 518 may include an issuer of one or more digital wallet accounts (e.g., Google Pay, Apple Pay, etc.).

In one aspect, RTPs 520 include one or more real-time payment providers such as Zelle or a unified payments interface (UPI). Crypto wallets 522 may include wallets such as Coinbase and crypto.com wallets. Directories 524 may include information on payment interfaces such as a Unified Payment Interface, FedNow, Visa ADS, or directories belonging to Google Pay, Meta, or belonging to large financial institutions like Chase, Wells Fargo, State Bank of India etc.

In one aspect, UPAYID 514 contains information that allows payment server 106 to facilitate a financial transaction between a payer and a payee using the systems and methods described herein. UPAYID 514 may be similar to directory 410. In one aspect, UPAYID 514 includes data that:

Enables payment server 106 to perform a payment credential-to-UPA-to-payee account information lookup and resolution, Payment server 106 can use to execute the funds transfer authorization from the payer to the payee.

For example, if a payer wishes to use an RTP to transfer funds to a payee, payment server 106 may use data from RTPs 520 to map the corresponding payee payment credential to the appropriate RTP (e.g., Zelle). Using this mapping, payment server may then authorize the transfer of funds from the payer account to the payee account.

FIG. 6A depicts payee IP address table 601 that presents different payment credentials for a payee. Payee IP address table 601 may be a table form of payee IP address 412. As depicted, each payment instrument (i.e., DC, bank account, digital wallet, crypto wallet, and RTP) is associated with a PUSH operation. Each of these payment instruments has a respective custodian. These payment instruments are mapped to IP addresses IP1, IP2, IP3, IP4, and IP5, respectively.

In one aspect, payment server 106 uses payee IP address table 601 to resolve (or map) a payment credential to appropriate financial information associated with a payee. For example, a payee email address may be mapped to a bank account with IP address IP2. In this case, payment server 106 can contact the bank (issuer) to transfer funds into the payee's bank account. In another example, a payee phone number may be mapped to a Zelle account with IP address IP5. In this case, payment server 106 can contact the Zelle network to facilitate the financial transfer.

FIG. 6B is a table 602 that presents a sequence of operations associated with a financial transaction. At a first stage of the sequence, a payer (i.e., a payer computing device such as payer computing device 102) performs a GET operation, requesting one or more IP addresses corresponding to a set of payee aliases. This IP address may be used for the subsequent PUSH financial transaction. In one aspect, a payer such as payer 302 or payer 402 enters one or more payee public aliases such as a phone number, an email address, or some other alias for the payee, into an application on payer computing device 102. In some aspects, a public alias may be visible in the public domain.

At a second stage, a DNS resolver or a server that acts like a DNS server (i.e., payment server 106) responds to the GET request with one or more IP addresses corresponding to the payee aliases. As depicted in FIG. 6B, payment server 106 responds with an IP1 and an IP3 in response to two payee aliases. As part of the GET response, a payer could also get payee's name and physical address as optional details. In one aspect, payment server 106 gets all requested information by accessing a directory (e.g., directory 502), that may be implemented as a block chain.

Based on the information returned by payment server 106, the payer may review payee information: name, physical address, payment credential details (account, etc.). The payer can also review the payee name and a physical address associated with the payee, to confirm before proceeding to pay. If there are multiple payee payment credentials returned, the payer can review and select a payment credential based on one or more criteria (e.g., cost, speed, value/velocity limits, etc.) or the payee's default choice.

At the final stage, the payer may review the payee name and physical address before proceeding to the payment (confirmation of payee). The payer computing device can perform a PUSH operation to push (PUT) a specified amount of funds to a payee payment instrument corresponding to a selected IP address, along with details of the payer. For example, FIG. 6B depicts the payer using IP1 as the selected IP address for the financial transaction.

In one aspect, a payer selects an IP address from a set of multiple IP addresses (or payment credentials) for a payment transfer depending on different selection parameters. For example, if the payee needs the funds in a rush and is willing to pay a higher transaction fee for the rush transfer, then the payer and payee might agree to use a first payment credential. On the other hand, if the payee is willing to wait for their funds and/or does not wish to incur an excess surcharge, then a payment credential with lower transaction fees may be selected.

In one aspect, a payer might stop pursuing a transaction if the payee information like name and physical address are different than what payer originally thought they would be. Canceling or electing not to continue a transaction based on non-confirmation of payee information by the payer can help prevent any fraud and risk exposure.

FIG. 6C depicts an IP address table 630 that presents different payment credentials for a payee. As depicted, IP address table 630 includes a payment method—a debit card, a bank account, a wallet, a cryptocurrency, or a real-time payment (RTP). The corresponding custodian may be an issuer, an issuer, a wallet provider, one or more wallets, or UPI/Zelle, respectively. A corresponding payment credential may be a first email address, a first phone number, any of a wallet ID or a second phone number, any of a Coinbase ID, a second email address, or a third phone number, or a fourth phone number, respectively. The respective IP addresses (universal payment addresses) may be IP1, IP2, IP3, IP4, or IP5. Finally, the respective payment instrument may be a credit card number or token, an account with a routing number, a wallet endpoint, a crypto wallet address, or a Zelle ID.

Figure 7:
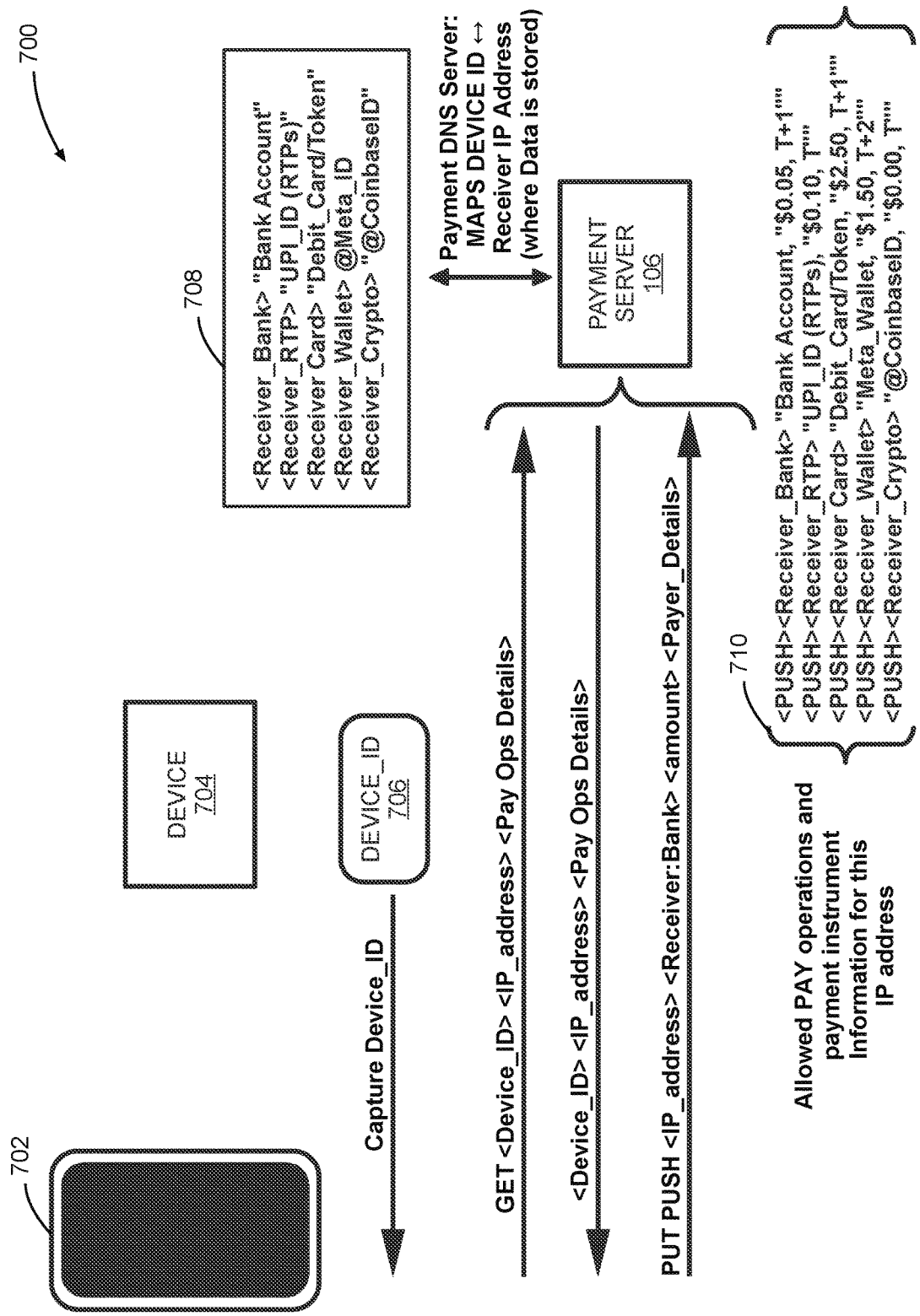
FIG. 7 is a schematic diagram depicting a sequence of operations associated with a financial transaction.

FIG. 7 is a schematic diagram depicting a sequence of operations associated with a financial transaction 700. As depicted, financial transaction 700 occurs between payer computing device 702 and device 704. Transaction 700 may be viewed as a detailed version of transaction 300. Payer computing device 702 may be similar to payer computing device 304, while device 704 may be similar to device 306.

In one aspect, payer computing device 702 receives one or more payment credentials from device 704. These payment credentials may be received as device_ID 706, using a GET Device_ID operation. Device_ID 706 may include one or more payment credentials of a payee associated with device 704.

In one aspect, payer computing device 702 uses a camera and a QR code reader application to read one or more payment credentials that might be printed or displayed on device 704. Or, a payer such as payer 302 can enter the payment credentials manually into a software application running on payer computing device 702.

After receiving device_ID 706, payer computing device 702 may perform a GET operation to request an IP address associated with the device_ID 706. This request may be transmitted from payer computing device 702 to payment server 106 (also referred to as a "Payment DNS Server"). In one aspect, payment server 106 maps the device_ID 706 to a receiver IP address from a set of receiver IP addresses 708. This process is similar to a DNS address resolution.

Set of receiver IP addresses 708 may be stored in a directory such as directory 502. As depicted, set of receiver IP addresses 708 includes IP addresses associated with a bank account, a UPI ID, a debit card/token, a Meta ID, and a Coinbase ID. Other embodiments of receiver IP addresses 708 may include other kinds of financial account or financial instrument data.

At the next stage, payment server 106 transmits the IP address and payment account details back to payer computing device 702 as a response to the GET request. In this response, additional optional detail like: cost, speed, limits, compliance, etc. for the selected payment instrument may be included. Finally, payer computing device 702 performs a PUSH operation to push a payment to a selected payment instrument for a selected amount. In transaction 700, payer computing device 702 has an option to select one of the five listed payment instruments for the PUSH transaction, as indicated in FIG. 7. Additional information available to a payer associated with payer computing device 702 include an additional cost of a transaction (e.g., a surcharge), and a time it would take for the transaction to process. This information may be provided by a payment processor associated with a particular payment instrument. As depicted, a bank account may charge the payer $0.05, with a one-day transaction period. An RTP may cost the payer $0.10, with substantially real-time transfer. A debit card or token may cost the payer $2.50, with a one-day transaction period. A wallet transaction may charge the payer $1.50, and may take two days to process. A crypto transaction may be free-of-charge, and may be substantially instantaneous.

In this particular example, payer computing device 702 selects an IP address associated with the bank account. In response to the PUSH transaction, payment server 106 completes financial transaction 700 by authorizing a transfer of funds from a payer financial account to the selected bank account (i.e., the payee financial account).

Figure 8:
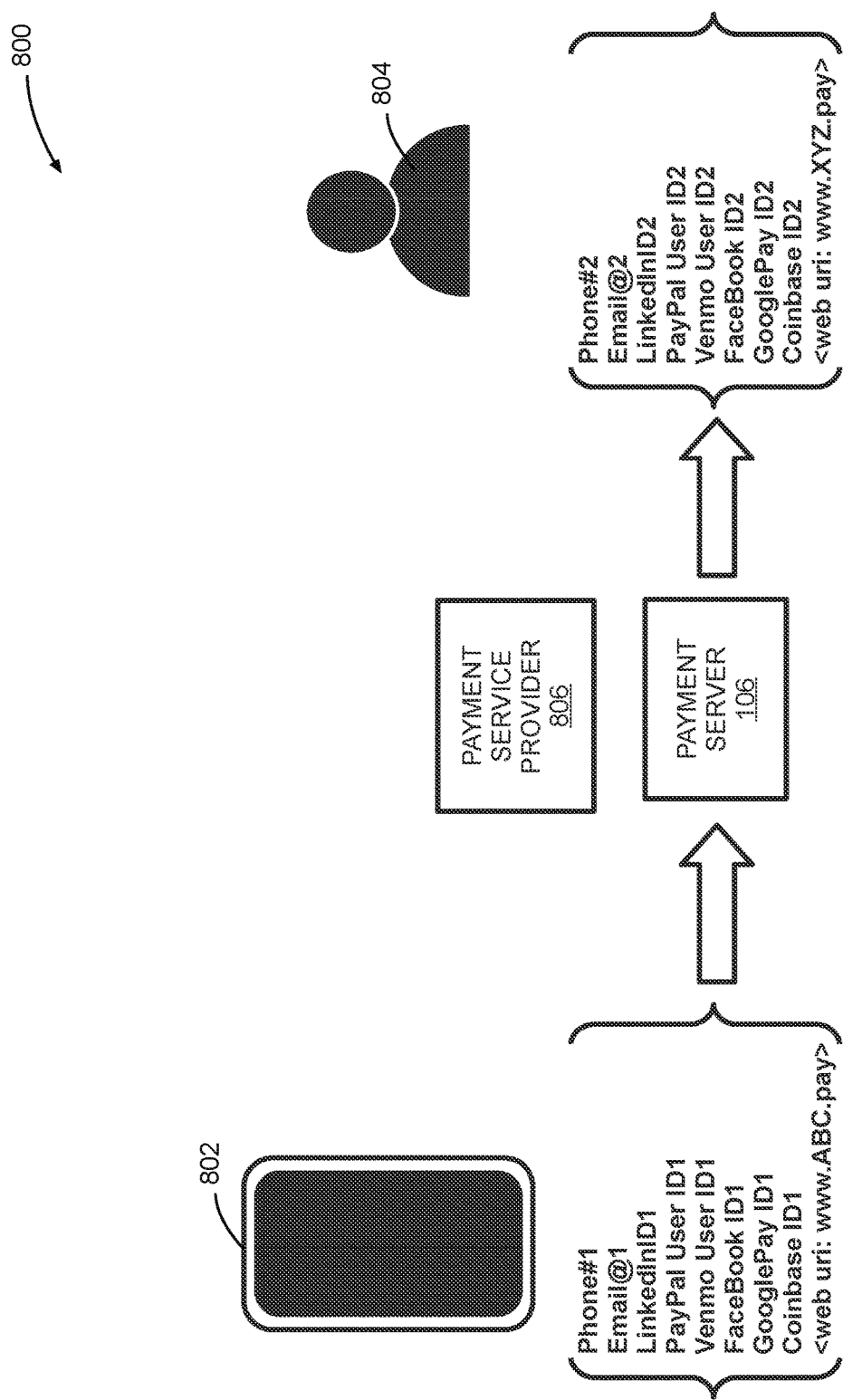
FIG. 8 is a schematic diagram depicting a financial transaction from a payer computing device to a payee.

FIG. 8 is a schematic diagram depicting a financial transaction 800 from a payer computing device 802 to a payee. As depicted, financial transaction 700 occurs between payer computing device 802 and payee 804 (specifically, a financial account associated with payee 804). As depicted, a payer associated with payer computing device 802 can use a payment account linked to any one of several payer payment credentials (phone number, email address, etc. as depicted in FIG. 8) to send funds via payment server, to payee 804. The funds may be sent to a payment account associated with one of several payee payment credentials (phone number, email address, etc. as depicted in FIG. 8). The financial transaction may be processed by payment service provider 806. The financial transaction process may be similar to financial transaction 400. Financial transaction 800 is an example of a payer payment credential (e.g., a payer alias) sending funds to a payee payment credential (e.g., a payee alias).

In one aspect, a payment credential may be a publicly-available identifier that is discoverable and verifiable by various identity platforms and sources. Examples of payment credentials include a phone number, an email, a LinkedIn ID, a PayPal user ID, a Venmo user ID, a Facebook ID, a Google Pay ID, a Coinbase ID, a web uniform resource identifier (URI), or a merchant account or a website, for each of the payer and the payee.

In one aspect, information exchange between payer and payee may be accomplished using a DNS Resolver (i.e., payment server 106). The DNS resolver may further abstract out all payment information and preferences. Payment resources may be defined by various custodians of the associated resources (i.e., financial instruments) for PUSH operations, and approved by the user (i.e., a payer or a payee).

Figure 9:
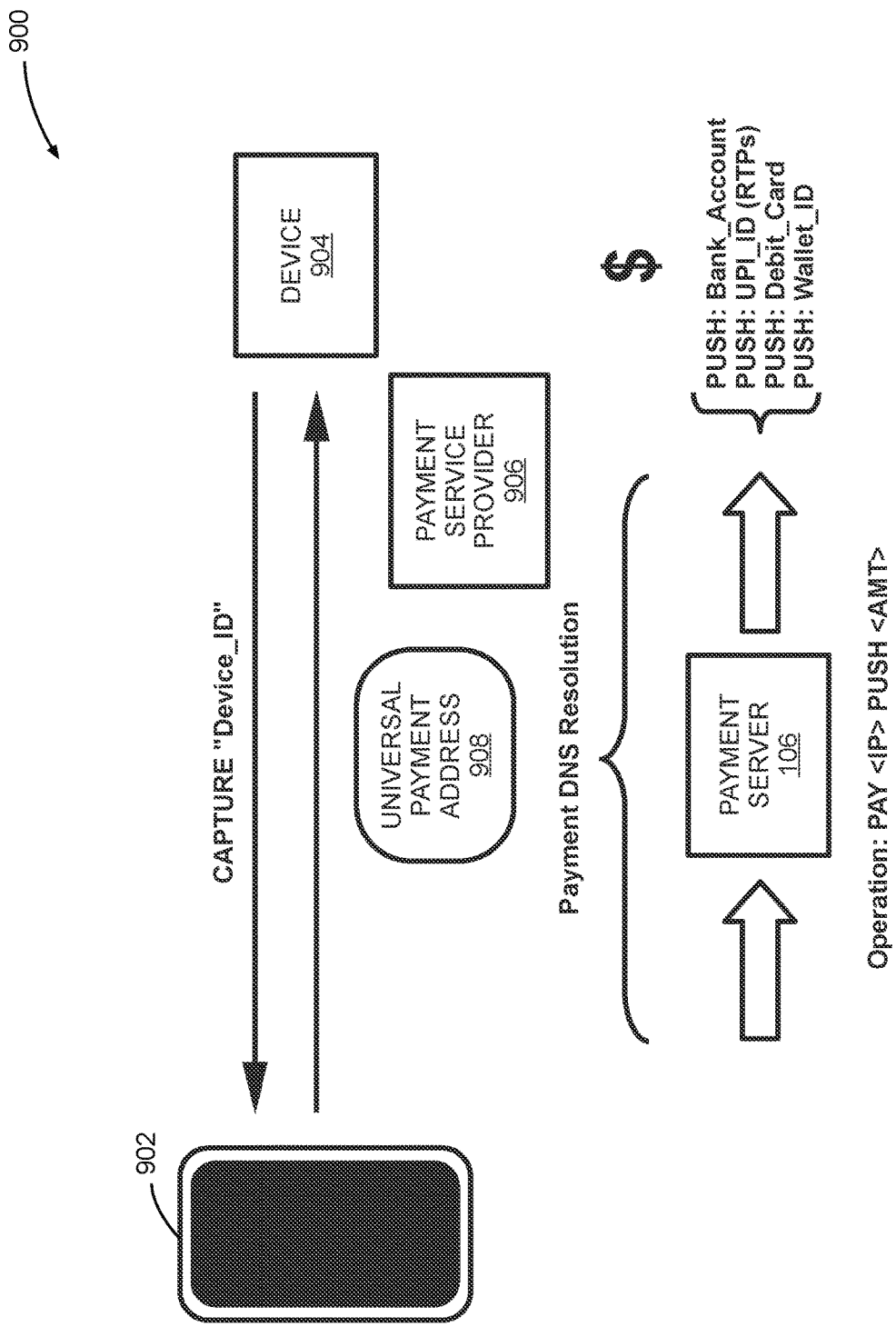
FIG. 9 is a schematic diagram depicting a financial transaction from a payer to a device.

FIG. 9 is a schematic diagram depicting a financial transaction 900 from a payer computing device 902 to a device 904. Financial transaction 900 may be similar to financial transaction 300, and may include payment server 106 performing a payment DNS resolution in response to a payment request from payer computing device 902.

As depicted, payer computing device may perform a CAPTURE operation to retrieve a device ID associated with device 904. Based on this device ID, payer computing device 902 may select a payment credential that is resolved to universal payment address 906 by payment server 106. Payment server may also forward a PAY operation associated with the universal payment address (IP address), with a PUSH payment for a specified amount, to payment service provider 906. Payment service provider 906 may complete the financial transaction by transferring the funds. The funds may be pushed to any one of several financial instruments, e.g., a bank account, an RTP, a debit card, or a digital wallet.

In one aspect, a payment credential may be a publicly-available identifier that is discoverable and verifiable by various identity platforms and sources. Examples of payment credentials include a phone number, an email, a LinkedIn ID, a PayPal user ID, a Venmo user ID, a Facebook ID, a Google Pay ID, a Coinbase ID, a web uniform resource identifier (URI), a website of a Merchant, or a merchant ID provided by an acquirer for each device such as device 904.

Using a universal IP address for payments, a device ID may be mapped to an IP address, and resolved through a DNS resolver (e.g., payment server 106) based on PUSH or PULL operations. Payment resources may be defined by various custodians of the resource for PUSH operations associated with the device. This provides flexibility to a payer on how they can pay (i.e., implement the financial transaction).

Figure 10:
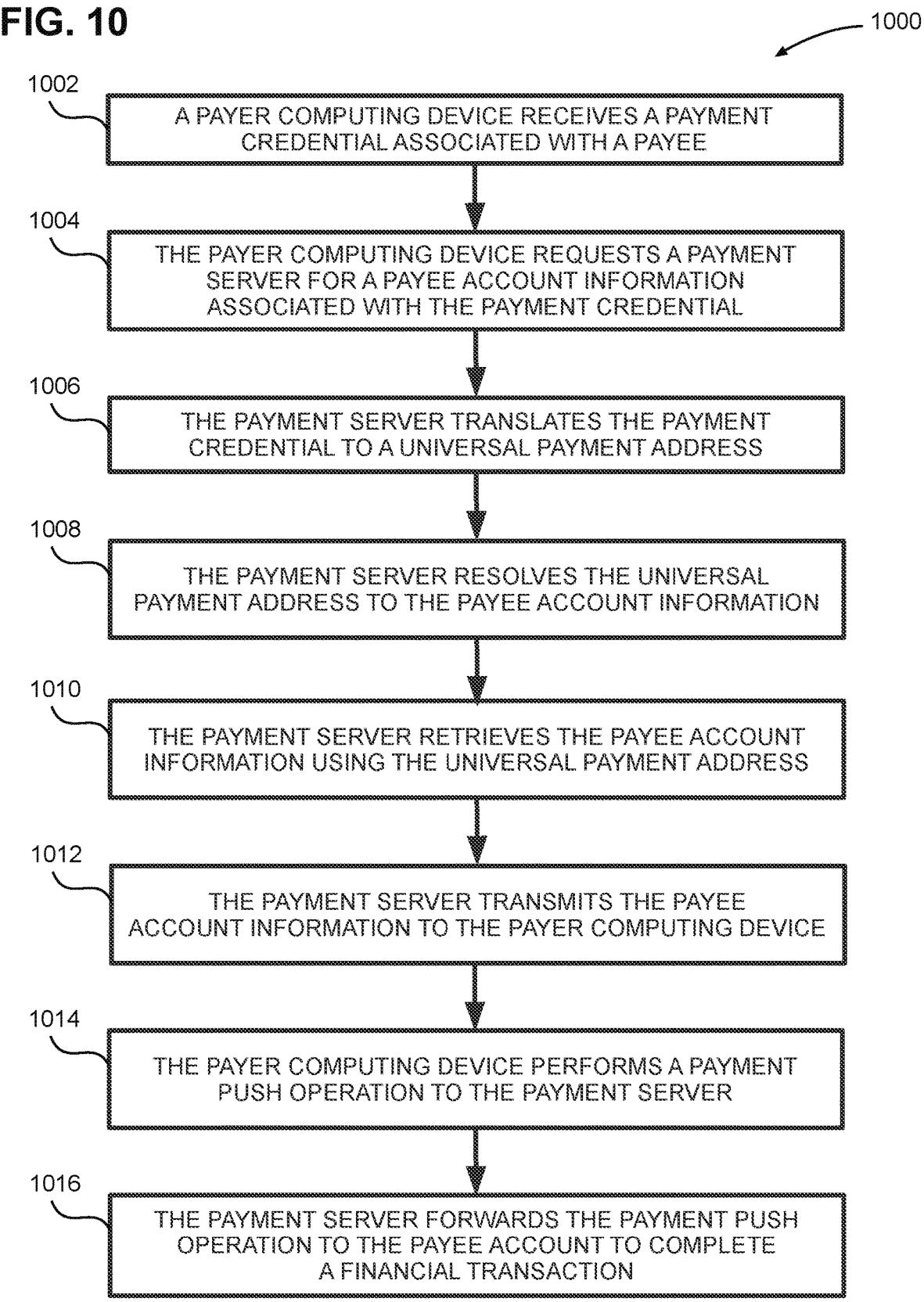
FIG. 10 is a flow diagram depicting a method to perform a financial transaction.

FIG. 10 is a flow diagram depicting a method 1000 to perform a financial transaction. Method 1000 includes a payer computing device (e.g., payer computing device 102) receiving a payment credential associated with a payee (e.g., payee 112) (1002). In one aspect, the payment credential is mapped to a universal payment address.

Method 1000 includes the payer computing device requesting a payment server for a payee account information associated with the payment credential (1004). For example, payer computing device 102 may request payment server 106 for the payment credential via public network 110.

Method 1000 includes the payment server translating the payment credential to the universal payment address (1006). For example, payment server 106 may translate the payment credential to an IP address (i.e., a universal payment address) included in IP address table 414.

Method 1000 includes the payment server resolving the universal payment address to the payee account information (1008). For example, payment server 106 may perform a payment DNS resolution (i.e., a payment credential resolution) to map the payment credential and universal payment address to payee account information (e.g., a crypto wallet in crypto wallets 510) stored in directory 502. In an aspect, payment server may perform this resolution using the universal payment address.

Method 1000 includes the payment server retrieving the payee account information using the universal payment address (1010). For example, payment server 106 may retrieve payee account information from directory using the universal payment address corresponding to the payment credential.

Method 1000 includes the payment server transmitting the payee account information to the payer computing device (1012). For example, payment server 106 may transmit the payee account information to payer computing device 102 via public network 110.

Method 1000 includes the payer computing device performing a payment PUSH operation to the payment server (1014). For example, payer computing device 102 may perform a PUSH operation to payment server 106 to authorize the financial transaction via a payment processor associated with the payee account.

Method 1000 includes the payment server forwarding the payment PUSH operation to the payee account to complete a financial transaction between the payer computing device and the payee (1016). For example, payment server 106 may forward the payment PUSH operation to the payee account to complete the transaction. For example, the PUSH operation may be a request to transfer funds from a payer account to a payee account (e.g., a crypto wallet).

The systems and methods described herein make payment information exchange substantially ubiquitous across all payment types with the help of HTTP and make it Web3 compliant.

The systems and methods described herein implement an architecture where each of a payment resource like a bank account, a debit card number, a crypto address (e.g., Coinbase Wallet ID, MetaMask ID, etc.), or a wallet address (e.g., Google Pay, Meta Pay, PayPal, etc.) is assigned a unique IP address or a unique identifier.

Some aspects include a block chain-based universal payment address scheme, where all payment credential information is stored on the block chain by various participating nodes (issuers, wallet providers, RTP Schemes, etc.).

For example, when a debit card (digital or physical) is issued by an issuer, a unique IP address can be assigned to this "resource." This information may be stored on a permissionless block chain or any service that follows an open general ledger construct. This block chain may be accessible by all parties who are enlisted, along with the user identifiers like email, phone number, or some other alias.

Some aspects include a Payment DNS service (e.g., payment server 106) that is configured to resolve any <Alias ID> to an <IP Address>. The <IP Address> returned would be specific to Payment resources only.

As an example, in the case of a simple device payout using GET & PUT protocols, a payer can get all the options that are available for them to pay for a device. In this example, the device manufacturer maintains a web resource (IP address) where all acceptable payment instrument details are stored. The payer's system captures the device ID and calls a payment DNS resolver (e.g., payment server 106) to get the required information (including, for example, a name of a business that might be owning the device). This is much like how a browser calls a DNS server to get a resource through a GET operation right after a user types a URL. The payer then chooses the payment method that is most suitable and initiates the payment.

Similarly, in a P2P scenario, a Payee might have different payment instruments. Using publicly available aliases like a phone number or an email address of the payee, a payer can use a universal payment address (UPA)-supported application, and using HTTP methods can get the payee's payment instruments.

In one aspect, the systems and methods associated with payment system 100 include the following features:

Dynamically assigning IP addresses to Payment credentials: In one aspect, issuers (e.g., banks, custodians, etc.) who issue cards, bank accounts, or wallets, and so on, should use a facility to issue a unique IP address, and a publicly available alias. Examples of such dynamic IP address assignments include:

A phone number associated with a bank account may be assigned a first unique IP address.

An email address associated with a debit card may be assigned a second unique IP address.

In general, an alias associated with a payment credential may be assigned a unique IP address. Information associated with this IP address may be stored in a public block chain for lookup or reference by payment server 106.

In one aspect, a financial transaction may include:

A UPAYID Assignor: Qualified to assign a unique IP address to a payment instrument. A UPAYID assignor may act as a "node" in a directory such as a block chain. This access may be restricted to financial institutions, issuers, wallets, and other entities that own the payment credential.

A UPAYID Requestor: Requestors are qualified payer applications that are eligible to access the directory or block chain, based on a smart contract. These could be Google Pay, Square cash or Western Union, or any payor applications that could be on a mobile or web interface.

UPAYID Assignors may have a Web3 element where users can look at the alias—payment credential—IP combination, and have a way to set "preferred" or "default" for a specific payment instrument. Any Life Cycle Management (LCM) should be stored in the block chain for future use.

As an example of a use case, suppose a user has a prepaid card (e.g., a prepaid card purchased at Safeway), a card number associated with the prepaid card is assigned an IP address and linked to the user's phone number at the point-of-sale (POS) system as a part of an activation process. The consumer can then shop online with the phone number (instead of entering the card number). During the transaction, the merchant would do a GET Call to get the credentials (after verifying the card belongs to the consumer through an OTP/2nd factor on the phone/email Alias), and the payment process would be similar to the process implemented by the systems and methods described herein.

Using an IP address instead of a card number provides customization to the consumer, as well as fraud and risk protection since the card number need not be displayed on the card. A merchant can also use their website/URL assigned as a payment credential to receive money for all their sales after they send a "REQUEST for PAY" to a consumer. The consumer reviews the request, and PAYS to the Merchant's IP address with the help of a payment processor.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
a payment server receiving one or more payment credentials and one or more corresponding payment instruments associated with a payee;
the payment server generating a unique universal payment address for each payment instrument, wherein each universal payment address is a unique universal resource indicator (URI) specific for payments;

the payment server mapping each corresponding payment credential to a respective universal payment address corresponding to an associated payment instrument;

the payment server storing each combination of a payment instrument from the payment instruments, a corresponding universal payment address, and a corresponding payment credential to a directory comprising a block chain, wherein the block chain is configured to prevent unauthorized access to each combination, wherein the generating, mapping and storing are performed subsequent to the payment server performing a secure authentication for the payee, and each payment instrument is verified based on an issuer of the respective payment instrument being previously stored as a unique node on the block chain;

the payment server maintaining and updating the block chain based on changes to a combination stored on the block chain;

a payer computing device receiving at least one of the one or more payment credentials associated with the payee;

the payer computing device selecting a payment credential for a financial transaction from the payment credentials received by the payer computing device;

the payer computing device requesting the payment server for a payment instrument corresponding to the selected payment credential;

the payment server authenticating the request;

the payment server translating the selected payment credential to a universal payment address corresponding to the selected payment credential by accessing the block chain;

the payment server resolving the universal payment address corresponding to the selected payment credential to the payment instrument corresponding to the selected payment credential;

the payment server retrieving the payment instrument corresponding to the selected payment credential using the universal payment address corresponding to the selected payment credential;

the payment server transmitting the payment instrument corresponding to the selected payment credential to the payer computing device;

the payer computing device performing a payment PUSH operation to the payment server; and the payment server forwarding the payment PUSH operation to the payment instrument corresponding to the selected payment credential to complete a financial transaction between the payer computing device and the payee.

2. The method of claim 1, wherein the payment credentials are received by the payer computing device as any combination of an electronic list, a quick-response (QR) code, or manually entered into the payer computing device by the payer.

3. The method of claim 1, further comprising a publicly-accessible service configured to retrieve the selected payment credential for the universal payment address corresponding to the selected payment credential using a GET operation.

4. The method of claim 1, wherein the block chain is a permissionless block chain.

5. The method of claim 4, further comprising the block chain transmitting the universal payment address corresponding to the selected payment credential to the payment server.

6. The method of claim 4, wherein the storing is performed by an authorized entity.

7. The method of claim 1, wherein a payee computing device associated with the payee transmits the one or more payment credentials to the payer computing device responsive to the payer computing device requesting the payment credentials from the payee.

8. The method of claim 1, wherein the payment PUSH operation is a request to forward funds from a payer account associated with the payer to the payment instrument.

9. The method of claim 1, further comprising providing, to the payer computing system, additional information including a payee name, a physical address associated with the payee, a transaction cost, one or more value-velocity limits, a speed for settlements, and one or more acceptable regulations for each universal payment address.

10. The method of claim 1, wherein each URI is a unique Universal Payment Identifier (UPAYID).

11. The method of claim 1, wherein each payment credential is any of a name, a phone number, an email address, a social media handle, or a tax identification number.

12. The method of claim 1, wherein the payment instrument is any of a bank account, a debit card, a crypto wallet, a digital wallet, or a mobile wallet.

13. An apparatus comprising:
a payer computing device;
a public network; and
a payment server communicatively coupled to the payer computing device via the public network, wherein:
the payment server receives one or more payment credentials and one or more corresponding payment instruments associated with a payee;
the payment server generates a unique universal payment address for each payment instrument, wherein each universal payment address is a unique universal resource indicator (URI) specific for payments;
the payment server maps each corresponding payment credential to a respective universal payment address corresponding to an associated payment instrument;
the payment server stores each combination of a payment instrument from the payment instruments, a corresponding universal payment address, and a corresponding payment credential to a directory comprising a block chain, wherein the block chain is configured to prevent unauthorized access to each combination, wherein the generating, mapping and storing are performed subsequent to the payment server performing a secure authentication for the payee, and each payment instrument is verified based on an issuer of the respective payment instrument being previously stored as a unique node on the block chain;
the payment server maintains and updates the block chain based on changes to a combination stored on the block chain;
the payer computing device receives at least one of the one or more payment credentials associated with the payee;
the payer computing device selects a payment credential for a financial transaction from the payment credentials received by the payer computing device;
the payer computing device requests the payment server for a payment instrument corresponding to the selected payment credential;
the payment server authenticates the request;
the payment server translates the selected payment credential to a universal payment address corresponding to the selected payment credential by accessing the directory;

the payment server resolves the universal payment address corresponding to the selected payment credential to the payment instrument corresponding to the selected payment credential;

the payment server retrieves the payment instrument corresponding to the selected payment credential using the universal payment address corresponding to the selected payment credential;

the payment server transmits the payment instrument corresponding to the selected payment credential to the payer computing device;

the payer computing device performs a payment PUSH operation to the payment server; and the payment server forwards the payment PUSH operation to the payment instrument corresponding to the selected payment credential to complete a financial transaction between the payer computing device and the payee.

14. The apparatus of claim 13, wherein the payer computing device is any of a mobile phone, a mobile computing device, a tablet, a laptop computer, or a desktop computer.

15. The apparatus of claim 13, further comprising a device associated with the payee, wherein the payer computing device is configured to receive the payment credentials from the device.

16. The apparatus of claim 15, wherein the device is any of a scooter, an appliance, an audio entertainment device, or a vehicle.

17. The apparatus of claim 13, wherein the block chain is a permissionless block chain.

18. The apparatus of claim 13, further comprising a publicly-accessible service configured to create the unique universal payment address for the payment credential, wherein the payment credential is stored in a central location.

19. The apparatus of claim 13, further comprising a publicly-accessible service configured to retrieve the payment credential for the universal payment address using a GET operation.

\* \* \* \* \*